(12) United States Patent
Hong

(10) Patent No.: US 12,556,585 B2
(45) Date of Patent: Feb. 17, 2026

(54) COMMUNICATION METHOD AND APPARATUS, AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 117 days.

(21) Appl. No.: 18/580,587

(22) PCT Filed: Jul. 19, 2021

(86) PCT No.: PCT/CN2021/107121
§ 371 (c)(1),
(2) Date: Jan. 18, 2024

(87) PCT Pub. No.: WO2023/000137
PCT Pub. Date: Jan. 26, 2023

(65) Prior Publication Data
US 2024/0323231 A1    Sep. 26, 2024

(51) Int. Cl.
*H04L 29/06* (2006.01)
*H04L 9/40* (2022.01)

(52) U.S. Cl.
CPC .................................. *H04L 63/20* (2013.01)

(58) Field of Classification Search
CPC ......... H04L 63/20; H04L 63/10; H04L 63/12; H04L 63/045; H04L 63/0263; H04L 63/14
See application file for complete search history.

(56) References Cited

U.S. PATENT DOCUMENTS

2019/0246282 A1    8/2019  Li et al.
2020/0053126 A1    2/2020  Nair et al.

FOREIGN PATENT DOCUMENTS

| CN | 110830993 A | 2/2020 |
| CN | 111641944 A | 9/2020 |
| CN | 111-866-857 A | * 10/2020 |

(Continued)

OTHER PUBLICATIONS

3GPP TSG-RAN—WG2 #113bis electronic Online—Apr. 2021. (Year: 2021).*

(Continued)

*Primary Examiner* — Longbit Chai
(74) *Attorney, Agent, or Firm* — Arch & Lake LLP; Hao Tan; Shen Wang

(57) ABSTRACT

The present disclosure provides a communication method and apparatus, and a device. The communication method may be applied to a communication system, such as an onboarding network (ONN) system. The method may include: an access network device receives a registration request message from a terminal device, establishment cause information carried in the registration request message being to log on to a standalone non-public network (SNPN); and the access network device configures a user plane security policy of the terminal device as a first security policy according to the establishment cause information so as to indicate to activate user plane encryption protection and/or user plane integrity protection for a DRB belonging to a PDU session.

19 Claims, 7 Drawing Sheets

(56) References Cited

FOREIGN PATENT DOCUMENTS

WO  2020162610 A1  8/2020

OTHER PUBLICATIONS

International Search Report of Application No. PCT/CN2021/107121 dated Apr. 19, 2022 with English translation, (6p).
CMCC,."Discussion the issues to support UE on-boarding and remote provisioning",3GPP TSG-RAN WG2#II3bis electronic Online, Apr. 12-Apr. 20, 2021, R2-2103690, with English translation, (6p).
Intel Corporation."RAN2 impact or sur port UE onboarding and provisioning for NPN",3GPP TSG RAN WG2 Meeting #113b-e, E-Meeting, Apr. 12-20, 2021, R2-2102837, with English translation, (2p).
Samsung."On Supporting Onboarding SNPN" 3GPF TSG-RAN WG2 Meeting#II3bis-e Online, Apr. 12-Apr. 20, 2021, R2-2104043, with English translation, (4p).
Huawei, HiSilicon, "Accessing to SNPN with credentials owned by a separate entity",3GPP TSG RAN WG2#1I3bis-e Electronic, Apr. 12-20, 2021, R2-2103170, with English translation, (5p).
3rd Generation Partnership Project; Technical Specification Group Services and System Aspects; System architecture for the 5G System (5GS); Stage 2 (Release 18), 3GPP TS 23.501 V18.4.0 (Dec. 2023), (698p).
3rd Generation Partnership Project; Technical Specification Group Services and System Aspects; Procedures for the 5G System (5GS); Stage 2 (Release 18), 3GPP TS 23.502 V18.4.0 (Dec. 2023) Technical Specification, (899p).
3rd Generation Partnership Project; Technical Specification Group Services and System Aspects; Security architecture and procedures for 5G system (Release 18), 3GPP TS 33.501 V18.4.0 (Dec. 2023), (326p).
CNOA issued in Application No. 202180002206.6 dated Feb. 19, 2025 with English translation, (16p).

\* cited by examiner

COMMUNICATION METHOD AND APPARATUS, AND DEVICE

CROSS-REFERENCE TO RELATED APPLICATIONS

The present application is a U.S. National Stage of International Application No. PCT/CN2021/107121, filed on Jul. 19, 2021, the entire disclosure of which is incorporated herein by reference for all purposes.

TECHNICAL FIELD

The present disclosure relates to the field of wireless communication technology, and in particular, to a communication method, apparatus and device.

BACKGROUND

With the continuous development of wireless communication technology, the standalone non-public network (SNPN) is a network in the 5th generation (5G) communication system that is different from public networks and provides services for specific users or organizations.

Currently, terminal devices need to provide SNPN credentials to log on to (onboarding) SNPN. Before this, terminal devices may obtain SNPN credentials by accessing the onboarding network (ONN).

SUMMARY

The present disclosure provides a communication method, apparatus and device.

In a first aspect, the present disclosure provides a communication method that can be applied to ONN, and the ONN is used to transmit SNPN credentials. The method may include: an access network device receiving a registration request message from a terminal device, where establishment cause information is carried in the registration request message, the establishment cause information is onboarding a SNPN; and the access network device configuring a user plane security policy of the terminal device as a first security policy according to the establishment cause information, where the first security policy is used to indicate to activate at least one of user plane encryption protection or user plane integrity protection for a data radio bearer (DRB) belonging to a protocol data unit (PDU) session.

In a second aspect, the present disclosure provides a communication method that can be applied to the ONN, and the ONN is used to transmit SNPN credentials. The method may include: the terminal device receiving second indication information from an access network device, where the second indication information is used to indicate whether to activate at least one of user plane encryption protection or user plane integrity protection for a data radio bearer (DRB) belonging to a protocol data unit (PDU) session; the terminal device verifying whether the second indication information meets a security requirement for protecting SNPN credentials; the terminal device determining whether to initiate at least one of the user plane encryption protection or the user plane integrity protection for the DRB according to a verification result.

In a third aspect, the present disclosure provides a communication apparatus. The communication apparatus can be an access network device (such as gNB) in the above communication system or a chip or system-on-chip in the access network device, and it can also be functional modules used to implement the methods described in each of the above aspects in the access network device. The communication apparatus can realize the functions performed by the access network device in the above aspects, and these functions can be realized by hardware executing corresponding software. This hardware or software includes one or more modules corresponding to the above functions. The communication apparatus includes: a first receiving module, configured to receive a registration request message from a terminal device, where establishment cause information is carried in the registration request message, the establishment cause information is onboarding a standalone non-public network; and a first processing module, configured to configure a user plane security policy of the terminal device as a first security policy according to the establishment cause information, where the first security policy is used to indicate to activate at least one of user plane encryption protection or user plane integrity protection for a data radio bearer (DRB) belonging to a protocol data unit (PDU) session.

In the fourth aspect, the present disclosure provides a communication apparatus. The communication apparatus can be a terminal device (such as a UE) in the above communication system or a chip or system-on-chip in the terminal device, and it can also be functional modules used to implement the methods described in each of the above aspects in the terminal device. The communication apparatus can realize the functions performed by the terminal device in the above aspects, and these functions can be realized by hardware executing corresponding software. This hardware or software includes one or more modules corresponding to the above functions. The communication apparatus includes: a second receiving module, configured to receive second indication information from an access network device, where the second indication information is used to indicate whether to activate at least one of user plane encryption protection or user plane integrity protection for a data radio bearer (DRB) belonging to a protocol data unit (PDU) session; a second processing module, configured for the terminal device to verify whether the second indication information meets a security requirement for protecting standalone non-public network credentials; determine whether to initiate at least one of the user plane encryption protection or the user plane integrity protection for the DRB according to a verification result.

In a fifth aspect, the present disclosure provides an access network device, including: a memory; and a processor, connected to the memory, and configured to execute computer-executable instructions stored on the memory to implement the communication method according to the first aspect, the second aspect and any possible implementation thereof.

In a sixth aspect, the present disclosure provides a terminal device, including: a memory; and a processor, connected to the memory, and configured to execute computer-executable instructions stored on the memory to implement the communication method according to the first aspect, the second aspect and any possible implementation thereof.

In a seventh aspect, the present disclosure provides a non-transient computer storage medium, having computer-executable instructions stored thereon, where the computer-executable instructions are able to implement the communication method according to the first aspect, the second aspect and any possible implementation thereof after being executed by a processor.

It should be understood that the technical solutions of the third to seventh aspects of the present disclosure are consistent with those of the first to second aspects, and the beneficial effects achieved by each aspect and corresponding feasible implementations are similar, and will not be described again.

DETAILED DESCRIPTION

Figure 1:
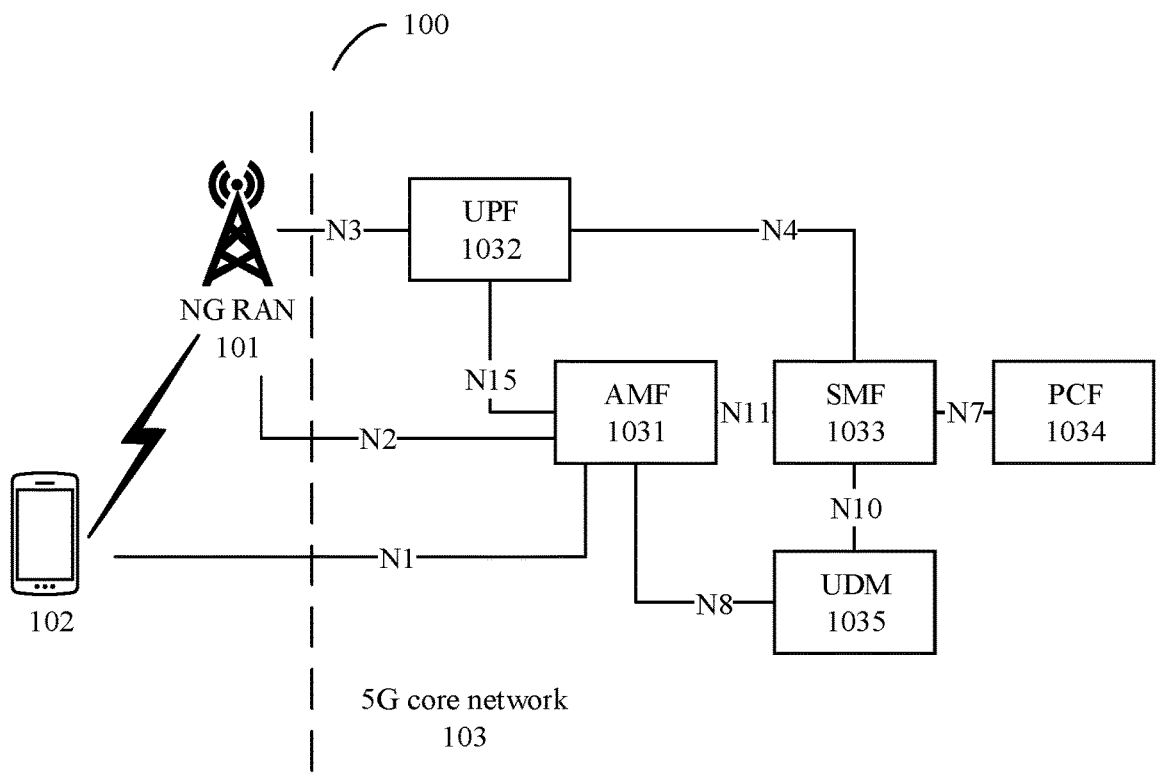
FIG. 1 is a schematic structural diagram of a communication system in an embodiment of the present disclosure.

Embodiments will be described in detail herein, examples of which are illustrated in the accompanying drawings. When the following description refers to the drawings, the same numbers in different drawings refer to the same or similar elements unless otherwise indicated. The implementations described in the following example embodiments do not represent all implementations consistent with embodiments of the present disclosure. Rather, they are merely examples of apparatus and methods consistent with aspects of embodiments of the disclosure as detailed in the appended claims.

The terminology used in embodiments of the present disclosure is for the purpose of describing particular embodiments only and is not intended to limit embodiments of the disclosure. As used in embodiments and the appended claims in this disclosure, the singular forms "a" and "the" are intended to include the plural forms as well, unless the context clearly dictates otherwise. It will also be understood that the term "and/or" as used herein refers to and includes any and all possible combinations of one or more of the associated listed items.

It should be understood that although the terms "first," "second," "third," etc. may be used in embodiments of this disclosure to describe various information, the information should not be limited to these terms. These terms are only used to distinguish information of the same type from each other. For example, without departing from the scope of the present disclosure, "first information" may also be called "second information," and similarly, "second information" may also be called "first information." Depending on the context, the word "if" as used herein may be interpreted as "when . . . " or "at the time of . . . " or "in response to determining."

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Further, in the description of the embodiments of the present disclosure, "and/or" is only an association relationship for describing associated objects, indicating that three relationships can exist. For example, A and/or B can mean: A exists alone, A and B exist simultaneously, and B exists alone. In addition, in the description of the embodiments of the present disclosure, "plurality" may refer to two or more than two.

With the development of wireless communication technology, 5GS (i.e. 5G system) can support SNPN. In order to enhance support for terminal devices to log on to SNPN, the terminal devices need to provide SNPN credentials (and/or other information) for authentication, and then log on to the SNPN required by the terminal device. Then, before this, the terminal device should be allowed to access ONN, to obtain SNPN credentials.

Embodiments of the present disclosure provide a communication system, which can be applied to the above ONN. FIG. 1 is a schematic structural diagram of a communication system in an embodiment of the present disclosure. Referring to FIG. 1, the communication system 100 may include a 5G access network (AN) and a 5G core network (5GC). The 5G access network may include a next generation radio access network (NG RAN) 101. The NG RAN 101 communicates with the terminal device 102 through the Uu interface. The 5G core network 103 may include: access and mobility management function (AMF) 1031, user plane function (UPF) 1032, session management function (SMF) 1033, policy control function (PCF) 1034, and unified data management (UDM) 1035, etc.

In the embodiment of the present disclosure, the above communication system may also include other network elements, which is not specifically limited in the embodiment of the present disclosure.

In the above communication system, the terminal device can access the 5G core network through the 3rd generation partnership project (3GPP) technology. Specifically, the terminal device can access the 5G core network through the 3GPP access network device.

In the above communication system, UDM has the function of unified data management, and is mainly responsible for managing contract data, user access authorization and other functions.

PCF has a policy control function and is mainly responsible for billing policies for sessions and business flows, and policy decisions related to quality of service (QOS) bandwidth guarantees, and policies. In this architecture, the PCF connected to AMF and SMF can correspond to AM PCF (PCF for access and mobility control) and SM PCF (PCF for session management) respectively. In actual deployment scenarios, AM PCF and SM PCF may not be the same PCF entity.

SMF has a session management function, which mainly performs functions such as session management, execution of control policies issued by PCF, selection of UPF, and allocation of Internet protocol (IP) addresses of UE.

AMF has access and mobility management functions and mainly performs mobility management, access authentication/authorization and other functions. In addition, it is also responsible for transmitting user policies between UE and PCF.

UPF is a user plane functional entity, as an interface with the data network, it completes functions such as user plane (UP) data forwarding, session/flow level-based billing statistics, bandwidth limitation, etc.

The functions of each interface are described as follows:

N7 is the interface between PCF and SMF, used to issue control policies for packet data unit (PDU) session granularity and service data flow granularity.

N3 is a communication interface between UPF and NG-RAN.

N15 is the interface between PCF and AMF, used to issue UE policies and access control related policies.

N4 is the interface between SMF and UPF, used to transfer information between the control plane and UP, including controlling the distribution of forwarding rules, QoS control rules, traffic statistics rules for UP and information reporting of UP.

N11 is the interface between SMF and AMF, used to transfer PDU session tunnel information between RAN and UPF, transfer control messages sent to UE, transfer radio resource control information sent to RAN, etc.

N2 is the interface between AMF and RAN, used to transfer wireless bearer control information from the core network side to the RAN.

N1 is the interface between AMF and UE, which has nothing to do with access, and is used to transfer QoS control rules to UE.

N8 is the interface between AMF and UDM, used for AMF to obtain access and mobility management-related subscription data and authentication data from UDM, and for AMF to register current mobility management-related information of the UE to UDM.

N10 is the interface between SMF and UDM, used for SMF to obtain session management-related subscription data from UDM, and for SMF to register UE current session-related information to UDM.

The above terminal device may be a terminal device with a wireless communication function, and may also be called user equipment (UE). Terminal devices can be deployed on land, including indoors or outdoors, handheld, wearable or vehicle-mounted; they can also be deployed on water (such as ships, etc.); and they can also be deployed in the air (such as aircraft, balloons, satellites, etc.). The above terminal device may be a mobile phone, a tablet computer (Pad), a computer with wireless transceiver functions, a virtual reality (VR) terminal device, an augmented reality (AR) terminal device, or a wireless terminal in industrial control, a wireless terminal in self-driving, a wireless terminal in remote medical, a wireless terminal in smart grid, a wireless terminal in transportation safety, a wireless terminal in smart city, a wireless terminal in smart home, etc. The terminal device may also be a handheld device, a vehicle-mounted device, a wearable device, a computing device having wireless communication functions, or other processing device connected to a wireless modem, etc. Optionally, the terminal device can also be called by different names in different networks, for example, terminal device, access terminal, subscriber unit, subscriber station, mobile station, mobile table, remote station, remote terminal, mobile device, user terminal, terminal, wireless communication device, user agent or user apparatus, cellular telephone, cordless telephone, session initiation protocol (SIP) telephone, wireless local loop (WLL) station, personal digital assistant (PDA), terminal device in 5G network or future evolution network, etc.

The above access network device may be a device used by the access network side to support terminal access to the wireless communication system. For example, it can be the next generation base station (next generation nodeB, gNB), transmission reception point (TRP), relay node, access point (AP) in the 5G access technology communication system.

It should be noted that in the communication system shown in FIG. 1, the functions and interfaces of each device are only exemplary, and not all functions of each device are necessary when applied to embodiments of the present disclosure. All or part of the devices of the core network may be physical devices or virtualized devices, which is not limited herein. The communication system in the embodiment of the present disclosure may also include other devices not shown in FIG. 1, which are not limited here.

In some possible implementations, the above ONN may be a public land mobile network (PLMN).

For example, the above ONN may be, but is not limited to, a 5G network adopting the following architecture.

Figure 2:
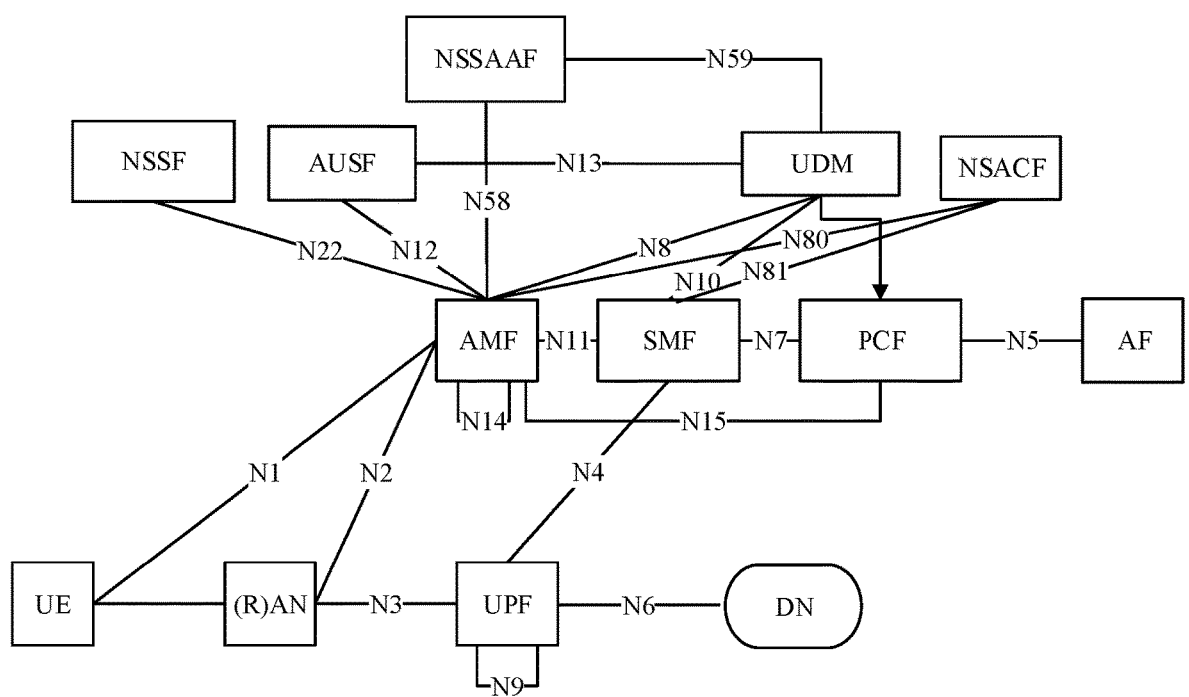
FIG. 2 is a schematic diagram of an architecture represented by reference points in a non-roaming 5G network in an embodiment of the present disclosure.

First, FIG. 2 is a schematic diagram of the architecture represented by reference points in the non-roaming 5G network in the embodiment of the present disclosure. As shown in FIG. 2, in the core network of the non-roaming 5G network, in addition to the above AMF, SMF, PCF and UDM, the 5G core network can also include: user plane function (UPF), data network (DN), application function (AF), authentication server function (AUSF), network slice selection function (NSSF), network slice-specific and SNPN authentication and authorization function (NSSAAF), network slice admission control function (NSACF), etc. The functions of each interface are described as follows. N7 is the communication interface between SMF and PCF; N5 is the communication interface between PCF and AF; N6 is the communication interface between UPF and DN; N9 is the communication interface between any two UPFs; N12 is the communication interface between AMF and AUSF; N22 is the communication interface between AMF and NSSF; N14 is the communication interface between any two AMFs; N58 is the communication interface between AMF and NSSAAF; N59 is the communication interface between NSSAAF and UDM; N80 is the communication interface between NSACF and AMF; N81 is the communication interface between NSACF and SMF; N13 is the communication interface between AUSF and UDM. PCF communicates with UDR.

Figure 3:
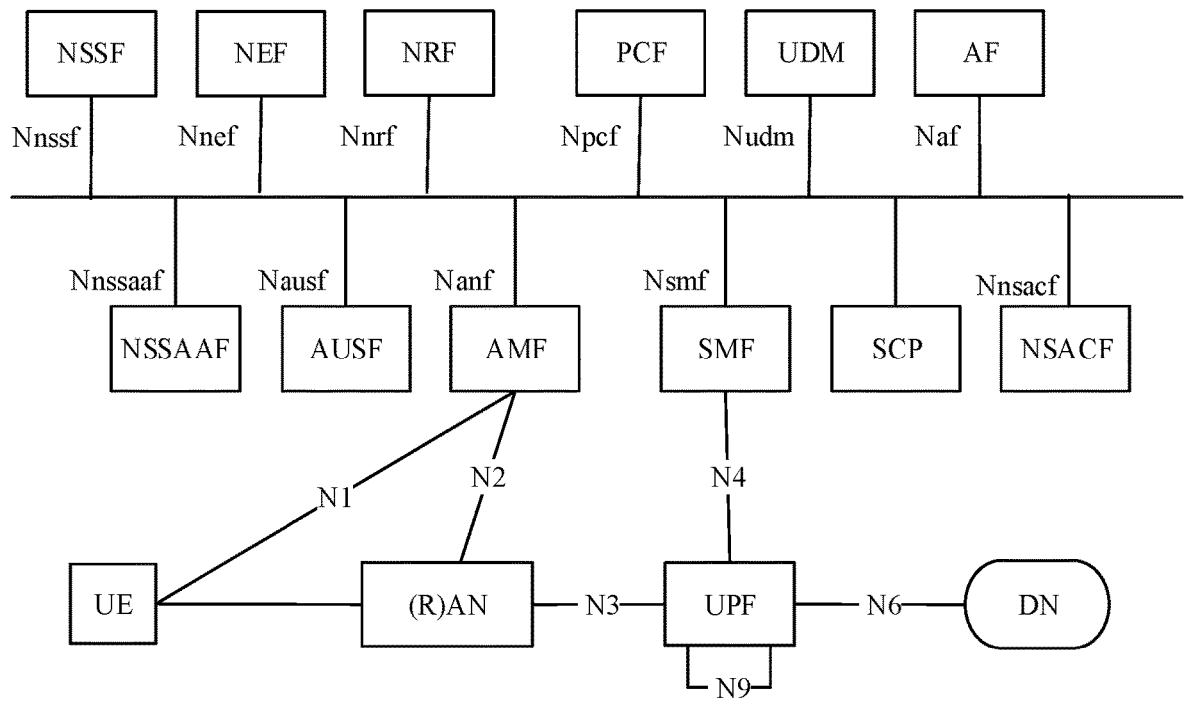
FIG. 3 is a schematic diagram of an architecture based on service-oriented interfaces in a non-roaming 5G network in an embodiment of the present disclosure.

Second, FIG. 3 is a schematic diagram of an architecture based on service-oriented interfaces in the non-roaming 5G network in the embodiment of the present disclosure. As shown in FIG. 3, in the core network of the non-roaming 5G network, service-oriented interfaces are used between each network element to interact. For example, NSSAAF, AUSF, AMF, SMF, NSACF, NSSF, network exposure function (NEF), network repository function (NRF), PCF, UDM or AF use service-oriented interfaces to interact. The service-oriented interface provided by NSSAAF to the outside world can be Nnssaaf, the service-oriented interface provided by ASUF to the outside world can be Nausf, the service-oriented interface provided by AMF to the outside world can be Namf, the service-oriented interface provided by SMF to the outside world can be Nsmf, and the service-oriented interface provided by NSACF to the outside world to the outside world can be Nnsacf. The service-oriented interface provided by NSSF to the outside world can be Nnssf, the service-oriented interface provided by NEF to the outside world can be Nnef, the service-oriented interface provided by NRF to the outside world can be Nnrf, the service-oriented interface provided by PCF to the outside world can be Npcf, and the service-oriented interface provided by UDM to the outside world can be Nudm, and the service-oriented interface provided by AF to the outside world can be Naf.

Optionally, as shown in FIG. 3, a service communication proxy (SCP) can also be deployed in the 5G core network, which can be used for indirect communication between network function (NF) and network function service (NF service).

It should be understood that the relevant description of the names of various service-oriented interfaces in FIGS. 2 and 3 can refer to the 5G system architecture diagram in the 3GPP TS 23.501 standard, and will not be described again here.

In some possible implementations, a terminal device (such as a UE) obtains SNPN credentials (that is, standalone non-public network credential) issued by a specific data network (DN) by logging on (onboarding) to the ONN. The UE can then log on to the SNPN based on the SNPN credentials. However, based on the existing protocol, if the ONN selected by the UE is not the home network of the UE, the UDM of the ONN does not have subscription information of the UE. In this way, the UP security policy on the Uu interface can be configured locally by SMF. There is currently no definition of how SMF determines the configuration of the security policy that protects the SNPN credentials.

Furthermore, since the SMF and the access network device are network elements in the ONN, the SNPN and the UE may not trust the SMF and the access network device in the ONN to correctly implement the configuration of the security policy that protects the SNPN credentials. Especially when there is a masquerading access network device or faulty access network device, the access network device may overrule the UP security policy received from the SMF and disable the UP security protection of the Uu interface, making the SNPN credentials unprotected.

Furthermore, since the UE only allows to implement UP security protection by following the security activation indication information sent by the access network device, and cannot distinguish whether the received security activation indication information matches the security requirement of the requested PDU session, making the SNPN credentials have security risks.

It can be seen that how to protect the SNPN credentials is an urgent problem that needs to be solved.

In order to solve the above problems, embodiments of the present disclosure provide a communication method, which can be applied to the above communication system. For example, the terminal device is a UE, the access network device may be a gNB in the ONN, the first core network device may be an AMF in the ONN, and the second core network device may be an SMF in the ONN.

Figure 4:
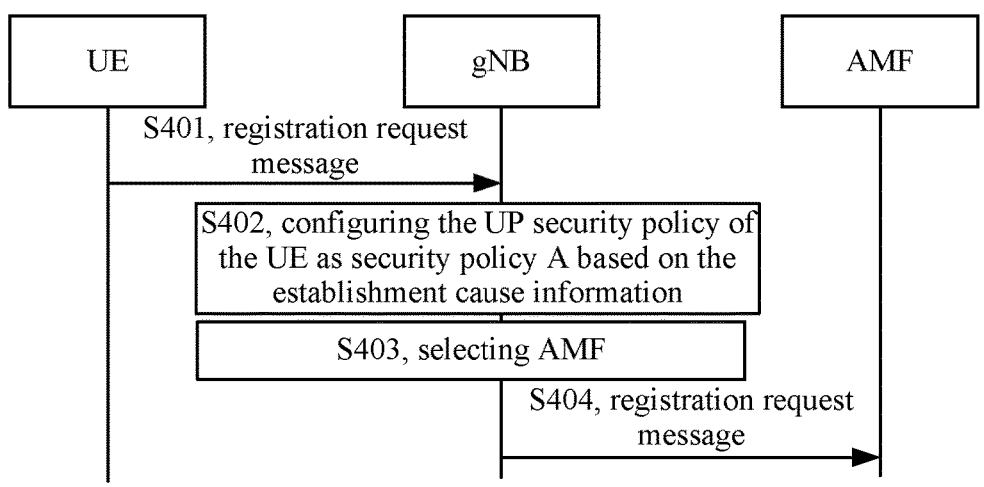
FIG. 4 is a schematic flowchart of a communication method in an embodiment of the present disclosure.

FIG. 4 is a schematic flowchart of an implementation of a communication method in an embodiment of the present disclosure. Referring to FIG. 4, the method may include following steps.

S401, the UE sends a registration request message to the gNB.

The registration request message may be non access stratum (NSA) signaling, such as a registration request message. Further, the registration request message may carry establishment cause information (such as establishment cause field), which is used to indicate the purpose of the UE initiating the registration request.

It can be understood that, before UE logs on to the SNPN, it needs to log on to ONN first to obtain the SNPN credentials. In S401, the UE may first send a registration request message to the gNB in the ONN first, and the carried establishment cause information may be onboarding SNPN, such as establishment cause=SNPN onboarding.

S402, the gNB configures the UP security policy of the UE as security policy A (i.e., the first security policy) based on the establishment cause information.

The UP security policy may indicate whether to activate user plane encryption (UP confidentiality) protection and/or user plane integrity (UP integrity) protection for the data radio bearer (DRB) belonging to a PDU session. Here, it can also be understood as that the UP security policy shall indicate whether UP confidentiality and/or UP integrity protection shall be activated or not for all DRBs belonging to that PDU session. The security policy A indicates to activate user plane encryption protection and/or user plane integrity protection for the DRB belonging to a PDU session; the security policy B indicates to deactivate user plane encryption protection and/or user plane integrity protection for the DRB belonging to a PDU session.

In some possible implementations, the gNB can provide security activation indication to the UE according to the UP security policy provided by the SMF. If the policy indicates "required" (i.e. user plane encryption protection and/or user plane integrity protection must be activated for the DRB belonging to the PDU session), then the gNB indicates to activate UP security protection for each DRB (here, the UP security protection for each DRB can be understood as initiating user plane encryption protection and/or user plane integrity protection for each DRB). If the policy indicates "not needed" (that is, user plane encryption protection and/or user plane integrity protection does not need to be activated for the DRB belonging to the PDU session), then the gNB instructs to deactivate UP security protection for each DRB, so that the establishment of PDU session will be carried out without protection. Then, the above security policy A can also be understood as configuring the UP security policy as "required", and the above security policy B can also be understood as configuring the UP security policy as "not needed".

Optionally, the UP security policy may include an indication field (i.e., the first field). The specific configuration of the UP security policy is indicated by different values of the indication field. For example, if the indication field is configured as "required", it means that the UP security policy is configured as security policy A; if the indication field is configured as "not needed", it means that the UP security policy is configured as security policy B.

It can be understood that, in S402, after receiving the registration request message from the UE, the gNB can obtain the establishment cause information carried in the registration request message. When the establishment cause information is SNPN onboarding, gNB configures the UP security policy of the UE as security policy A, that is, indicating to activate user plane encryption protection and/or user plane integrity protection for the DRB belonging to the PDU session.

In an embodiment, after S401, the gNB may also associate and store the identification information of the UE with the establishment cause information sent in S401, so that the gNB configures the UP security policy for the UE. Optionally, the identification information of the UE may be a temporary identification assigned to the UE by the gNB, such as a cell-radio network temporary identifier (C-RNTI).

In a possible implementation, as shown in FIG. 4, after S401, the above method further includes following steps.

S403, gNB selects AMF.

S404, gNB forwards the registration request message to AMF.

It can be understood that in S403 and S404, the gNB selects one AMF in the ONN according to the registration request message sent by the UE, and sends the registration request message to the AMF after selecting the AMF, to trigger the subsequent registration process.

At this point, the process of UE registration in ONN is completed.

In some possible implementations, when the UE successfully logs on to the ONN and wishes to receive the SNPN credentials through the ONN, the UE can initiate a PDU session establishment process. The specific PDU session establishment process is as shown in the embodiment of FIG. 5 below.

It should be noted that triggering the UE to initiate the PDU session establishment process for obtaining the SNPN credentials may depend on the implementation on the UE side, such as input of the user.

Figure 5:
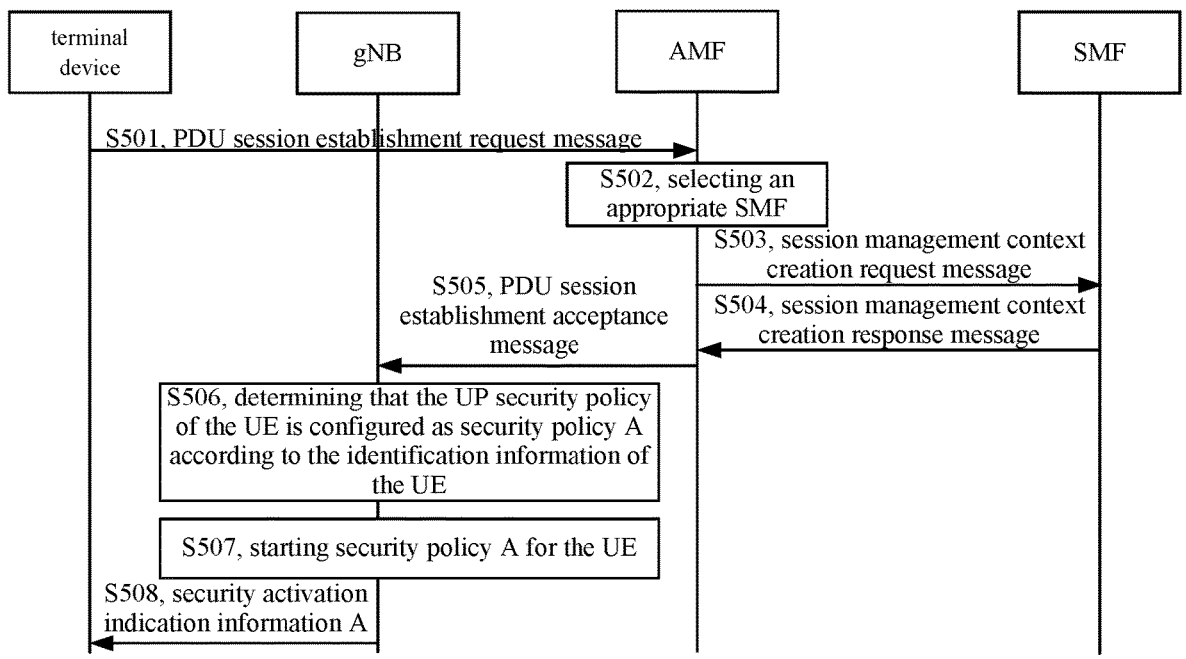
FIG. 5 is a schematic flowchart of another communication method in an embodiment of the present disclosure.

FIG. 5 is a schematic flowchart of another communication method in an embodiment of the present disclosure. Referring to FIG. 5, after S401 to S404, the above communication method may also include following steps.

S501, the UE sends a PDU session establishment request message to the AMF.

The PDU session establishment request message may be NSA signaling, such as the PDU session establishment request message. In one embodiment, the PDU session establishment request message is encapsulated in the N1 SM container in the uplink non-access layer transport message (i.e., UL NAS transport), and carries DNN, PDU session ID, and single-network slice selection assistance information (S-NSSAI) or the like, to be sent to the AMF together. Other information may also be included in the UL NAS transport, which is not specifically limited in this embodiment of the disclosure.

In one embodiment, the above DNN (which can also be understood as the DNN requested by the UE, i.e., the requested DNN)) can be pre-configured for the UE, and a provisioning server (PVS) can be deployed in the target DN (i.e., the above specific DN) corresponding to the DNN. The PVS may be an entity that provides the network credentials and other information for the UE to initiate SNPN access. In another embodiment, the above DNN may be provided by the ONN to the UE during the login process.

S502, the AMF selects an appropriate SMF to serve the DNN and S-NSSAI requested by the UE.

In some possible implementations, the AMF compares whether the DNN requested by the UE matches the DNN in the AMF onboarding configuration data. If does, S502 is performed; if not, the AMF rejects the PDU session establishment request message. The rejection reason of the AMF may be that the UE is limited to requesting one PDU session for providing the SNPN credentials.

S503, AMF sends a session management context creation request message (such as Nsmf_PDUSession_CreateSM-Context request) to SMF.

The Nsmf_PDUSession_CreateSMContext request can carry PDU session establishment request, subscription permanent identifier (SUPI), DNN, PDU Session ID, AMF ID, user location information, etc.

S504, SMF sends a session management context creation response message (such as Nsmf_PDUSession_CreateSM-Contextresponse) to AMF.

It can be understood that after receiving the session management context creation request message sent by AMF, SMF responds to it and sends back the response result to AMF, i.e., the session management context creation response message, in which the field "created" indicates that the creation is successful.

S505, AMF sends a PDU session establishment acceptance message to gNB.

Here, the PDU session establishment acceptance message corresponds to the PDU session.

In one embodiment, the PDU session establishment acceptance message (such as PDU session establishment accept) may be carried in the PDU session resource request message (such as N2 PDU session request). The N2 message may also carry the identification information of the UE (such as AMF UE NGAP ID and RAN UE NGAP ID). The AMF UE NGAP ID is the next generation application protocol (NGAP) ID of the UE in the AMF, and the RAN UE NGAP ID is the NGAP ID of the UE on the RAN side. Furthermore, the N2 message can also carry PDU session ID, network slice information, etc. It should be noted that the PDU session ID in the N2 message is consistent with the PDU session ID in S501.

S506, the gNB determines that the UP security policy of the UE is configured as security policy A according to the identification information of the UE.

In one embodiment, the gNB identifies the UE and determines that the UP security policy of UE is configured as security policy A (that is, the security policy indicates "required") based on the AMF UE NGAP ID and RAN UE NGAP ID received from the AMF.

S507, gNB starts security policy A for the UE.

It can be understood that, after determining that the UP security policy of the UE is configured as security policy A, the gNB starts to apply security policy A to the UE. That is, gNB performs user plane encryption protection and/or user plane integrity protection for the DRB belonging to the PDU used to transmit the SNPN credentials.

In some possible implementations, SMF can also provide gNB with the UP security policy on the Uu interface. After executing S506, gNB can overrule the UP security policy provided by SMF. In this way, regardless of the UP security policy provided by SMF, the DRB belonging to the PDU used to transmit the SNPN credentials performs user plane encryption protection and/or user plane integrity protection, thereby protecting the SNPN credentials.

S508, gNB sends security activation indication information A (i.e., first indication information) to the UE.

The security activation indication information A is used to indicate to activate user plane encryption protection and/or user plane integrity protection for the above DRB.

In an implementation example, the gNB may also send to the UE an access network specific signaling exchange (AN specific signaling exchange) related to the information received from the SMF. For example, when the UE establishes necessary access network resources, RRC connection reconfiguration may occur. At this time, in S508, the gNB carries the security activation indication information A in the RRC Connection Reconfiguration message (such as RRC Connection Reconfiguration) and sends it to the UE.

It should be noted that there are unexplained steps in the PDU session establishment process described in S501 to S508. For these unexplained steps, please refer to the UE-requested PDU session establishment in the 3GPP TS 23.502 standard. The process will not be described in detail here.

At this point, the process of the UE requesting to establish a PDU session in the ONN is completed.

In this embodiment of the present disclosure, the gNB can autonomously configure the UP security policy on the Uu interface, and configure the security policy for the PDU session used to transmit the SNPN credentials as "required", to indicate to activate user plane encryption protection and/or user plane integrity protection for a DRB of the PDU session, thereby protecting the SNPN credentials.

Based on the same inventive concept, in order to solve the above problems, embodiments of the present disclosure further provide another communication method, which can be applied to the above communication system. For example, the terminal device is a UE, the access network device may be a gNB in the ONN, the first core network device may be an AMF in the ONN, and the second core network device may be an SMF in the ONN.

Here, it should be noted that during the period when the UE requests to establish a PDU session in the ONN, the SMF can provide an UP security policy for the PDU session. The gNB may indicate to the UE whether to activate user plane encryption protection and/or user plane integrity protection of each DRB according to the received UP security policy. The UE must follow the instructions of gNB. If the UE implements UP security protection according to the instructions of the gNB, the SNPN credentials carried by these DRBs may have security risks. Then, in order to protect the SNPN credentials, during the process of the UE requesting to establish a PDU session in the ONN, the following communication method in FIG. 6 can be performed.

Figure 6:
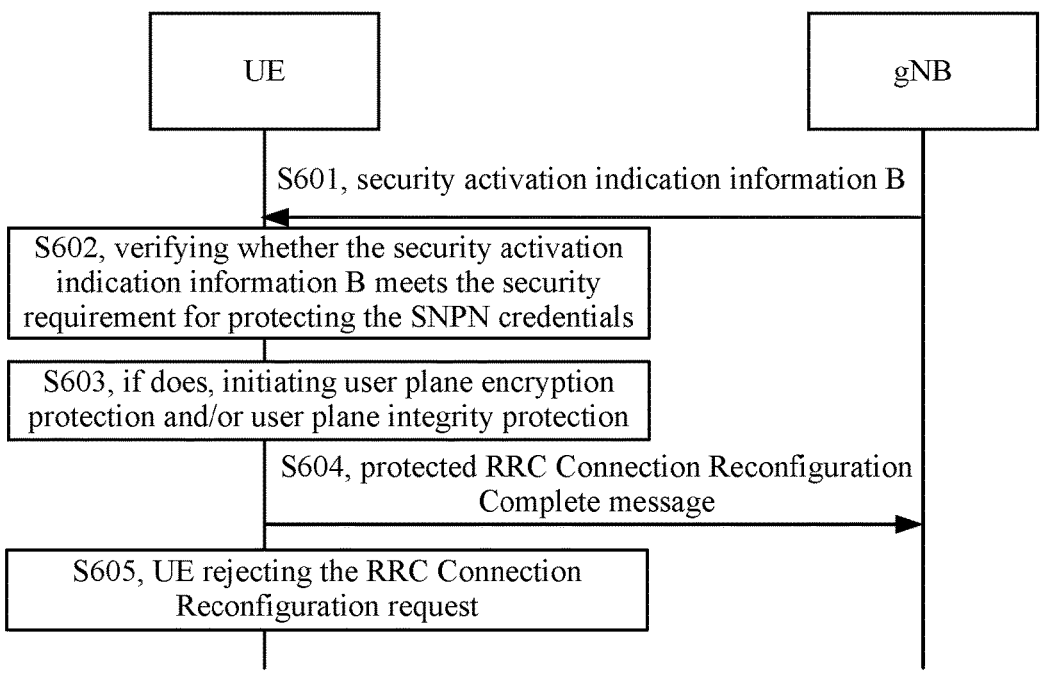
FIG. 6 is a schematic flowchart of yet another communication method in an embodiment of the present disclosure.

FIG. 6 is a schematic flowchart of an implementation of another communication method in an embodiment of the present disclosure. Referring to FIG. 6, the method may include following steps.

S601, gNB sends security activation indication information B (i.e., second indication information) to the UE.

The security activation indication information B is used to indicate whether to activate user plane encryption protection and/or user plane integrity protection for the DRB belonging to the PDU used to transmit the SNPN credentials.

Optionally, the security activation indication information B may be carried in the RRC Connection Reconfiguration message (such as RRC Connection Reconfiguration) sent by the gNB to the UE.

In one embodiment, before S601, gNB activates the access layer (AS) security mode, such as RRC security, to ensure that RRC messages between the UE and gNB are transmitted securely using AS security keys. Then, after S601 and before S602, the UE can also verify the received RRC Connection Reconfiguration based on the AS security mode, to ensure that the RRC Connection Reconfiguration is safe.

In some possible implementations, after S601, the gNB can also generate $K_{UPint}$ and $K_{UPenc}$, to perform user plane encryption protection and/or user plane integrity protection for the DRB carrying the SNPN credentials.

S602, the UE verifies whether the security activation indication information B meets the security requirement for protecting the SNPN credentials. If the requirement is met, S603 is executed; if the requirement is not met, S605 is executed.

In some possible implementations, in S602, the UE may indicate whether to activate user plane encryption protection and/or user plane integrity protection for the DRB belonging to the PDU used to transmit the SNPN credentials through the gNB, and verify whether the security activation indication information B meets the security requirement for protecting the SNPN credentials. When the security activation indication information B indicates to activate the user plane encryption protection and user plane integrity protection on the UE side for the DRB belonging to the PDU used to transmit the SNPN credentials, it indicates that the security activation indication information B meets the security requirement for protecting the SNPN credentials. When the security activation indication information B indicates to deactivate the user plane encryption protection and/or user plane integrity protection on the UE side for the DRB belonging to the PDU used to transmit the SNPN credentials, it indicates that the security activation indication information B does not meet the security requirement for protecting the SNPN credentials.

S603, the UE initiates user plane encryption protection and/or user plane integrity protection for the DRB belonging to the PDU used to transmit the SNPN credentials.

In an embodiment, in S603, the UE generates a user plane transmission key, such as $K_{UPint}$ and $K_{UPenc}$. The UE uses the user plane transmission key to perform user plane encryption protection and/or user plane integrity protection for the DRB carrying the SNPN credentials. $K_{UPint}$ is the user plane integrity protection key, and $K_{UPenc}$ is the user plane encryption protection key.

Further, after S603, the UE executes S604, and the UE sends a protected RRC Connection Reconfiguration Complete message (such as RRC Connection Reconfiguration Complete) to the gNB.

S605, the UE rejects the RRC Connection Reconfiguration request from the gNB.

It should be noted that there are unexplained steps in the PDU session establishment process described in S601 to S605. For these unexplained steps, please refer to the UE-requested PDU session establishment in the 3GPP TS 23.502 standard. The process will not be described in detail here.

In the embodiment of the present disclosure, the UE can verify whether the security activation indication issued by the gNB meets the security requirement for protecting the SNPN credentials. When the security activation indication issued by gNB does not meet the security requirement for protecting the SNPN credentials, the UE rejects the request of the gNB, to avoid security risks of the SNPN credentials and protect the SNPN credentials.

Figure 7:
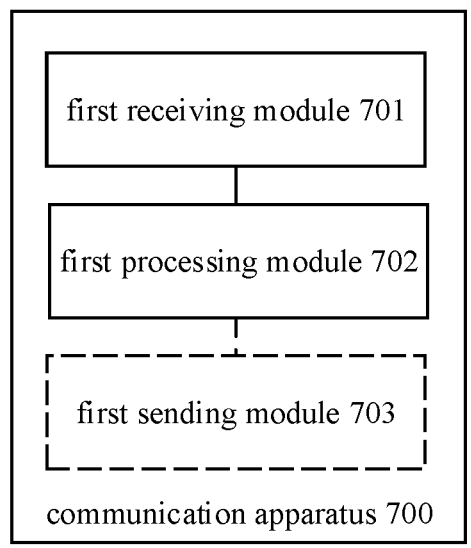
FIG. 7 is a schematic structural diagram of a communication apparatus in an embodiment of the present disclosure.

Based on the same inventive concept, embodiments of the present disclosure also provide a communication apparatus. The communication apparatus can be an access network device (such as gNB) in the above communication system or a chip or system-on-chip in the access network device, it can also be functional modules in the access network device used to implement the methods described in the above embodiments. The communication apparatus can realize the functions performed by the access network device in the above embodiments, and these functions can be realized by hardware executing corresponding software. This hardware or software includes one or more modules corresponding to the above functions. FIG. 7 is a schematic structural diagram of a communication apparatus in an embodiment of the present disclosure. See the solid line in FIG. 7, The communication apparatus 700 may include: a first receiving module 701, configured to receive a registration request message from a terminal device, wherein establishment cause information is carried in the registration request message, the establishment cause information is onboarding a standalone non-public network; and a first processing module 702, configured to configure a user plane security policy of the terminal device as a first security policy according to the establishment cause information, wherein the first security policy is used to indicate to activate user plane encryption protection and/or user plane integrity protection for a data radio bearer (DRB) belonging to a protocol data unit (PDU) session.

In some possible implementations, the first security policy includes a first field, the first field is used to indicate that it is required to activate the user plane encryption protection and/or the user plane integrity protection.

In some possible implementations, the first processing module 702 is further configured to associate and store identification information (such as C-RNTI) assigned to the terminal device with the establishment cause information after the first receiving module 701 receives the registration request message.

In some possible implementations, the first receiving module 701 is further configured to receive a PDU session establishment acceptance message from a first core network device belonging to the ONN after the first processing module 702 configures the user plane security policy of the terminal device as the first security policy according to the establishment cause message, the PDU session establishment acceptance message requests to establish a PDU session for transmitting the NPN credentials. The identification information of the terminal device is carried in the PDU session establishment acceptance message. The first processing module 702 is further configured to determine that the user plane security policy of the terminal device is configured as the first security policy according to the identification information of the terminal device; start the first security policy for the terminal device.

In some possible implementations, as shown by the dotted line in FIG. 7, the above communication apparatus 700 further includes a first sending module 703. The first sending module 703 is configured to send first indication information to the terminal device after the first processing module 702 determines that the user plane security policy of the terminal device is configured as the first security policy according to the identification information of the terminal device, where the first indication information is used to indicate to activate the user plane encryption protection and/or the user plane integrity protection for the DRB.

In some possible implementations, the first receiving module 701 is further configured to receive the user plane security policy of the terminal device indicated by a second core network device belonging to the ONN; the first processing module 702 is further configured to overrule the user plane security policy of the terminal device indicated by the second core network device.

It should be noted that for the specific implementation process of the first receiving module 701, the first processing module 702 and the first sending module 703, reference can be made to the detailed description of the embodiments in FIGS. 4 to 5. For the sake of brevity of the description, they will not be described again here.

The first receiving module 701 mentioned in the embodiment of the present disclosure may be a receiving interface, a receiving circuit or a receiver, etc. The first sending module 703 may be a sending interface, a sending circuit or a transmitter, etc. The first processing module 702 may be one or more processors.

Based on the same inventive concept, an embodiment of the present disclosure provides a communication apparatus.

The communication apparatus can be a terminal device (such as a UE) in the above communication system or a chip or system-on-chip in the terminal device, and it can also be functional modules used to implement the methods described in each of the above aspects in the terminal device. The communication apparatus can realize the functions performed by the terminal device in the above aspects, and these functions can be realized by hardware executing corresponding software. This hardware or software includes one or more modules corresponding to the above functions.

Figure 8:
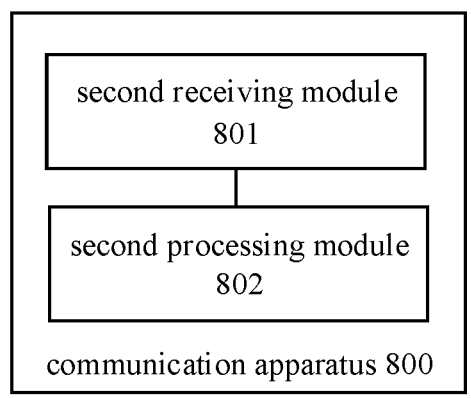
FIG. 8 is a schematic structural diagram of another communication apparatus in an embodiment of the present disclosure.

FIG. 8 is a schematic structural diagram of another communication apparatus in an embodiment of the present disclosure. Referring to FIG. 8, the communication apparatus 800 may include: a second receiving module 801, configured to receive second indication information from an access network device, where the second indication information is used to indicate whether to activate user plane encryption protection and/or user plane integrity protection for a data radio bearer (DRB) belonging to a protocol data unit (PDU) session; a second processing module 802, configured to verify whether the second indication information meets a security requirement for protecting standalone non-public network credentials; determine whether to initiate the user plane encryption protection and/or the user plane integrity protection for the DRB according to a verification result.

In some possible implementations, the second processing module 802 is configured to reject a radio resource control (RRC) connection reconfiguration request from the access network device, when the verification result indicates that the second indication information does not meet the security requirement; or, initiate the user plane encryption protection and/or the user plane integrity protection for the DRB, when the verification result indicates that the second indication information meets the security requirement.

In some possible implementations, the second processing module 802 is configured to verify the second indication information to indicate whether to activate the user plane encryption protection and/or the user plane integrity protection for the DRB; where, it indicates that the second indication information does not meet the requirement, when the second indication information indicates to deactivate the user plane encryption protection and/or the user plane integrity protection for the DRB on a terminal device side; and it indicates that the second indication information meets the security requirement, when the second indication information indicates to activate the user plane encryption protection and/or the user plane integrity protection for the DRB on the terminal device side.

In some possible implementations, the second indication information is carried in an RRC connection reconfiguration message sent by the access network device.

It should be noted that for the specific implementation process of the second receiving module 801 and the second processing module 802, reference can be made to the detailed description of the embodiment in FIG. 6. For the sake of simplicity of the description, details will not be described here.

The second receiving module 801 mentioned in the embodiment of this disclosure may be a receiving interface, a receiving circuit or a receiver, etc.; the second processing module 802 may be one or more processors.

Figure 9:
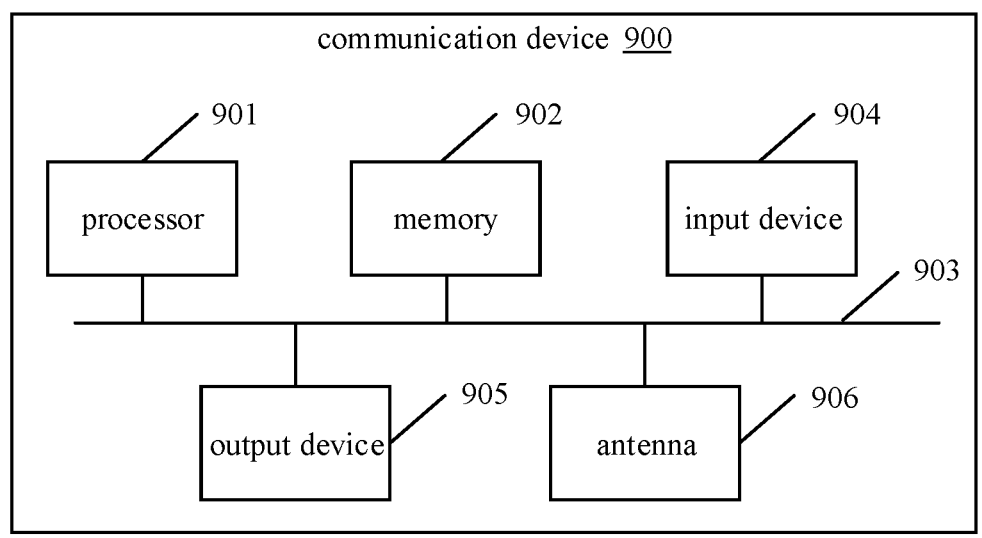
FIG. 9 is a schematic structural diagram of a communication device in an embodiment of the present disclosure.

Based on the same inventive concept, embodiments of the present disclosure provide a communication device, which may be the terminal device or access network device described in one or more of the above embodiments. FIG. 9 is a schematic structural diagram of a communication device in an embodiment of the present disclosure. As shown in FIG. 9, the communication device 900 uses general computer hardware, including a processor 901, a memory 902, a bus 903, an input device 904 and an output device 905.

In some possible implementations, the memory 902 may include computer storage media in the form of volatile and/or non-volatile memory, such as read-only memory and/or random access memory. The memory 902 may store an operating system, application programs, other program modules, executable codes, program data, user data, and the like.

The input device 904 may be used to input commands and information to a communication device. The input device 904 is, for example, a keyboard or pointing device such as a mouse, trackball, touch pad, microphone, joystick, game pad, satellite television antenna, scanner, or similar device. These input devices may be connected to the processor 901 via the bus 903.

The output device 905 can be used for communication devices to output information. In addition to the monitor, the output device 905 can also be other peripheral output devices, such as speakers and/or printing devices. These output devices can also be connected to the processor 901 through the bus 903.

The communication device may be connected to a network through the antenna 906, such as a local area network (LAN). In the networked environment, the computer execution instructions stored in the control device can be stored in a remote storage device and are not limited to local storage.

When the processor 901 in the communication device executes the executable codes or application programs stored in the memory 902, the communication device executes the communication method on the terminal device side or the access network device side in the above embodiments. For the specific execution process, please refer to the above embodiments, which will not be repeated herein.

In addition, the above memory 902 stores computer execution instructions for implementing the functions of the first receiving module 701, the first processing module 702, and the first sending module 703 in FIG. 7. The functions/implementation processes of the first receiving module 701, the first processing module 702 and the first sending module 703 in FIG. 7 can all be implemented by the processor 901 in FIG. 9 calling the computer execution instructions stored in the memory 902. The specific implementation processes and functions refer to the above related embodiments.

Alternatively, the above memory 902 stores computer execution instructions for implementing the functions of the second receiving module 801 and the second processing module 802 in FIG. 8. The functions/implementation processes of the second receiving module 801 and the second processing module 802 in FIG. 8 can be implemented by the processor 901 in FIG. 9 calling the computer execution instructions stored in the memory 902. The specific implementation processes and functions refer to the above related embodiments.

Based on the same inventive concept, embodiments of the present disclosure provide a terminal device that is consistent with the terminal device in one or more of the above embodiments. Optionally, the terminal device 1000 may be a mobile phone, a computer, a digital broadcast terminal, a messaging device, a game console, a tablet device, a medical device, a fitness device, a personal digital assistant, etc.

Figure 10:
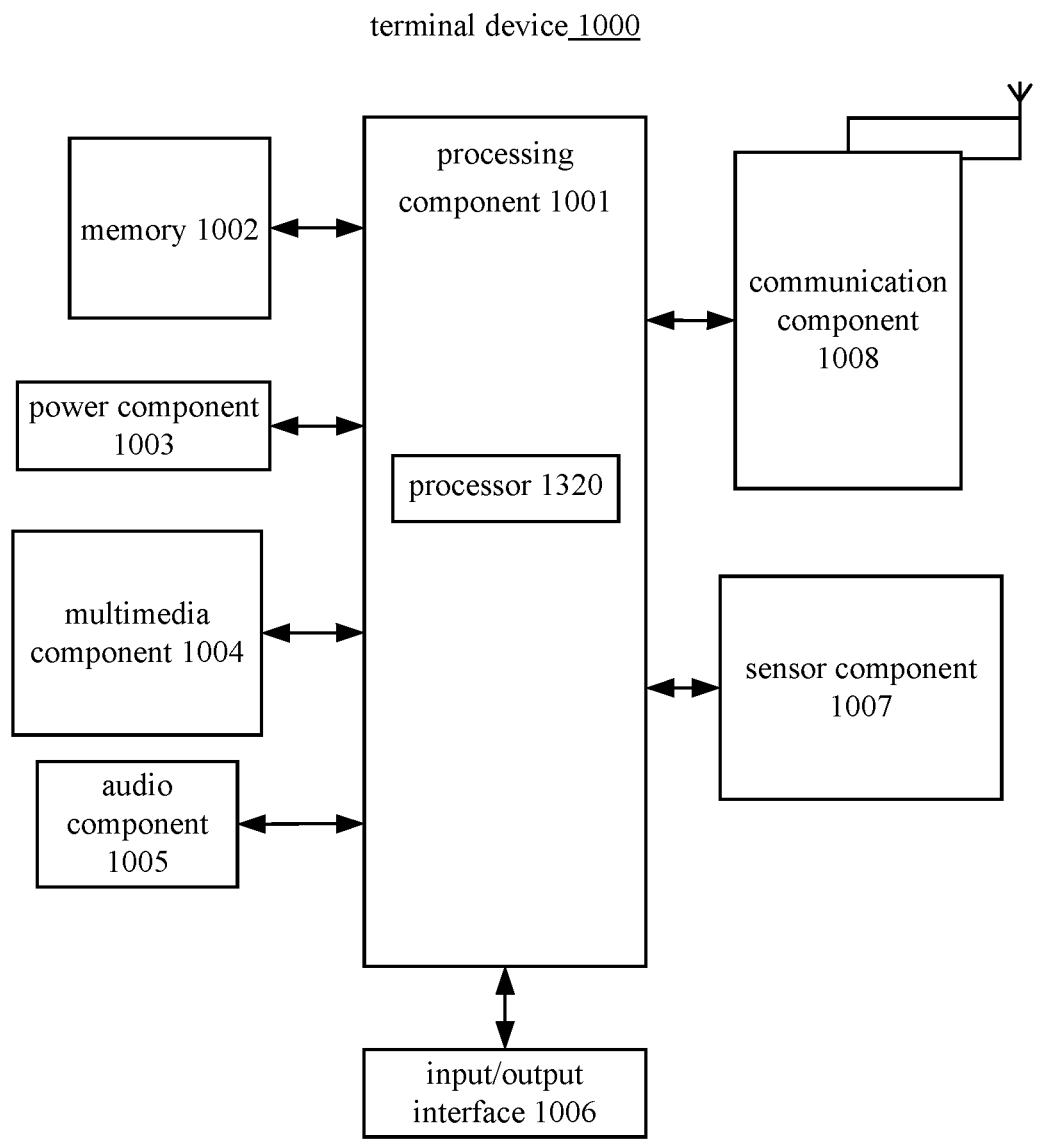
FIG. 10 is a schematic structural diagram of a terminal device in an embodiment of the present disclosure.

FIG. 10 is a schematic structural diagram of a terminal device according to an example embodiment. Referring to FIG. 10, the terminal device 1000 may include one or more of the following components: a processing component 1001, a memory 1002, a power component 1003, a multimedia component 1004, an audio component 1005, an input/output (I/O) interface 1006, a sensor component 1007, and a communication component 1008.

The processing component 1001 typically controls the overall operations of the terminal device 1000, such as the operations associated with display, telephone calls, data communications, camera operations, and recording operations. The processing component 1001 can include one or more processors 1310 to execute instructions to perform all or part of the steps in the above described methods. Moreover, the processing component 1001 can include one or more modules to facilitate the interaction between the processing component 1001 and other components. For example, the processing component 1001 can include a multimedia module to facilitate the interaction between the multimedia component 1004 and the processing component 1001.

The memory 1002 is configured to store various types of data to support the operation of the device 1000. Examples of such data include instructions for any application or method operated on the terminal device 1000, such as the contact data, the phone book data, messages, pictures, videos, and the like. The memory 1002 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1003 provides power to various components of the terminal device 1000. The power component 1003 can include a power management system, one or more power sources, and other components associated with the generation, management, and distribution of power in the terminal device 1000.

The multimedia component 1004 includes a screen providing an output interface between the terminal device 1000 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1004 includes a front camera and/or a rear camera. When the device 1000 is in an operation mode, such as a photographing mode or a video mode, the front camera and/or the rear camera can receive external multimedia data. Each of the front camera and the rear camera may be a fixed optical lens system or have focus and optical zoom capability.

The audio component 1005 is configured to output and/or input an audio signal. For example, the audio component 1005 includes a microphone (MIC) configured to receive an external audio signal when the terminal device 1000 is in an operation mode, such as a call mode, a recording mode, and a voice recognition mode. The received audio signal may be further stored in the memory 1002 or sent via the communication component 1008. In some embodiments, the audio component 1005 also includes a speaker for outputting the audio signal.

The I/O interface 1006 provides an interface between the processing component 1001 and peripheral interface modules, such as a keyboard, a click wheel, buttons, and the like.

These buttons may include, but not limited to, a home button, a volume button, a starting button, and a locking button.

The sensor component 1007 includes one or more sensors for providing state assessments of various aspects of the terminal device 1000. For example, the sensor component 1007 can detect an open/closed state of the terminal device 1000, relative positioning of components, such as the display and the keypad of the terminal device 1000. The sensor component 1007 can also detect a change in position of one component of the terminal device 1000 or the terminal device 1000, the presence or absence of user contact with the terminal device 1000, an orientation, or an acceleration/deceleration of the terminal device 1000, and a change in temperature of the terminal device 1000. The sensor component 1007 can also include a proximity sensor configured to detect the presence of nearby objects without any physical contact. The sensor component 1007 can also include a light sensor, such as a CMOS or CCD image sensor, configured to use in imaging applications. In some embodiments, the sensor component 1007 can also include an accelerometer sensor, a gyroscope sensor, a magnetic sensor, a pressure sensor, or a temperature sensor.

The communication component 1008 is configured to facilitate wired or wireless communication between the terminal device 1000 and other devices. The terminal device 1000 can access a wireless network based on a communication standard, such as WiFi, 2G, 3G, or a combination thereof. In an example embodiment, the communication component 1008 receives broadcast signals or broadcast associated information from an external broadcast management system via a broadcast channel. In an example embodiment, the communication component 1008 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an example embodiment, the terminal device 1000 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the above methods.

Based on the same inventive concept, embodiments of the present disclosure provide an access network device that is consistent with the access network device in one or more of the above embodiments.

Figure 11:
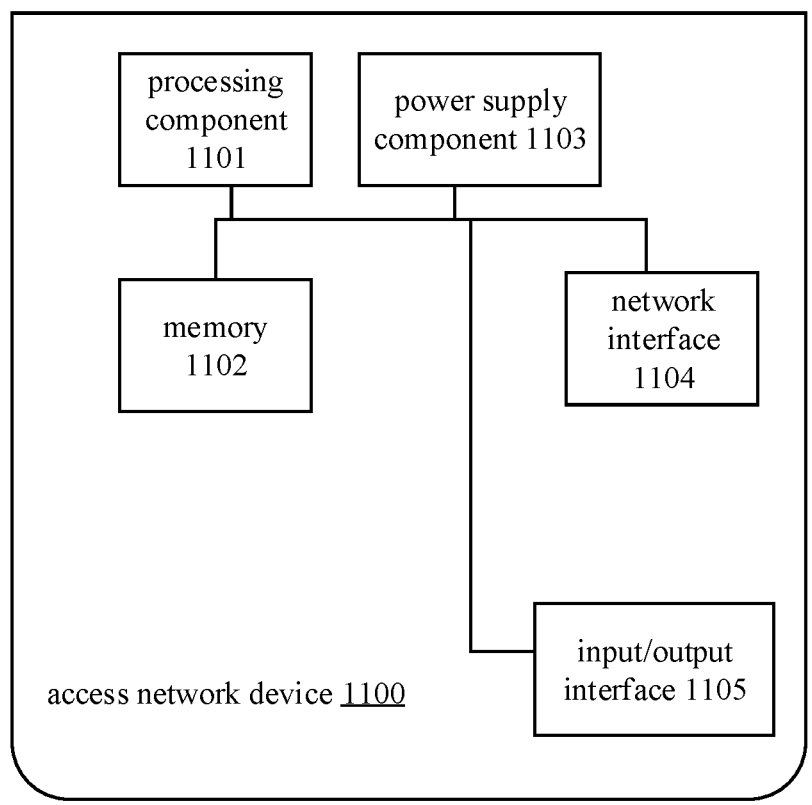
FIG. 11 is a schematic structural diagram of an access network device in an embodiment of the present disclosure.

FIG. 11 is a schematic structural diagram of an access network device in an embodiment of the present disclosure. Referring to FIG. 11, the access network device 1100 may include a processing component 1101, which further includes one or more processors, and memory resources represented by a memory 1102, for storing instructions, such as application programs, that can be executed by processing component 1101. An application stored in memory 1102 may include one or more modules, each of which corresponds to a set of instructions. In addition, the processing component 1101 is configured to execute instructions to execute any of the above methods applied to the access network device A.

The access network device 1100 may also include a power supply component 1103 configured to perform power management of the access network device 1100, a wired or wireless network interface 1104 configured to connect the access network device 1100 to the network, and an input/output (I/O) interface 1105. The access network device 1100 may operate based on an operating system stored in the memory 1102, such as Windows Server™, Mac OS X™, Unix™, Linux™, FreeBSD™ or the like.

Based on the same inventive concept, embodiments of the present disclosure also provide a computer-readable storage medium. Instructions are stored in the computer-readable storage medium. When the instructions are run on the computer, they are used to execute the communication method on the terminal device side or access network device A side in one or more of the above embodiments.

Based on the same inventive concept, embodiments of the present disclosure also provide a computer program or computer program product. When the computer program product is executed on a computer, the computer implements the communication method on the terminal device side or access network device A side in one or more of the above embodiments.

The present disclosure provides a communication method, apparatus and device, to protect SNPN credentials through user plane security policies.

In a first aspect, the present disclosure provides a communication method that can be applied to ONN, and the ONN is used to transmit SNPN credentials. The method may include: an access network device receiving a registration request message from a terminal device, where establishment cause information is carried in the registration request message, the establishment cause information is onboarding a SNPN; and the access network device configuring a user plane security policy of the terminal device as a first security policy according to the establishment cause information, where the first security policy is used to indicate to activate user plane encryption protection and/or user plane integrity protection for a data radio bearer (DRB) belonging to a protocol data unit (PDU) session.

In the present disclosure, the above PDU session is used to transmit SNPN credentials.

In some possible implementations, the first security policy includes a first field, the first field is used to indicate that it is required to activate the user plane encryption protection and/or the user plane integrity protection.

In some possible implementations, after the access network device receives the registration request message from the terminal device, the method further includes: the access network device associating and storing identification information (such as C-RNTI) assigned to the terminal device with the establishment cause information.

In some possible implementations, after the access network device configures the user plane security policy of the terminal device as the first security policy according to the establishment cause information, the method further includes: the access network device receiving a PDU session establishment acceptance message from a first core network device belonging to the ONN, the PDU session establishment acceptance message requests to establish a PDU session for transmitting SNPN credentials, identification information of the terminal device is carried in the PDU session establishment acceptance message; the access network device determines that the user plane security policy of the terminal device is configured as the first security policy according to the identification information of the terminal device; the access network device starts the first security policy for the terminal device.

In some possible implementations, after the access network device determines that the user plane security policy of the terminal device is configured as the first security policy according to the identification information of the terminal device, the method further includes: the access network device sending first indication information to the terminal device, where the first indication information is used to indicate to activate the user plane encryption protection and/or the user plane integrity protection for the DRB.

In some possible implementations, the method further includes: the access network device receiving the user plane security policy of the terminal device indicated by a second core network device belonging to the ONN; the access network device overruling (ignoring) the user plane security policy of the terminal device indicated by the second core network device.

In a second aspect, the present disclosure provides a communication method that can be applied to the ONN, and the ONN is used to transmit SNPN credentials. The method may include: the terminal device receiving second indication information from an access network device, where the second indication information is used to indicate whether to activate user plane encryption protection and/or user plane integrity protection for a data radio bearer (DRB) belonging to a protocol data unit (PDU) session; the terminal device verifying whether the second indication information meets a security requirement for protecting SNPN credentials; the terminal device determining whether to initiate the user plane encryption protection and/or the user plane integrity protection for the DRB according to a verification result.

In the present disclosure, the above PDU session is used to transmit SNPN credentials.

In some possible implementations, the terminal device determining whether to initiate the user plane encryption protection and/or the user plane integrity protection for the DRB according to a verification result includes: the terminal device rejecting a radio resource control (RRC) connection reconfiguration request from the access network device, when the verification result indicates that the second indication information does not meet the security requirement; or, the terminal device initiating the user plane encryption protection and/or the user plane integrity protection for the DRB, when the verification result indicates that the second indication information meets the security requirement.

In some possible implementations, the terminal device verifying whether the second indication information meets the security requirement for protecting the standalone non-public network credentials includes: the terminal device verifying the second indication information to indicate whether to activate the user plane encryption protection and/or the user plane integrity protection for the DRB; where, it indicates that the second indication information does not meet the requirement, when the second indication information indicates to deactivate the user plane encryption protection and/or the user plane integrity protection for the DRB on a terminal device side; and it indicates that the second indication information meets the security requirement, when the second indication information indicates to activate the user plane encryption protection and/or the user plane integrity protection for the DRB on the terminal device side.

In some possible implementations, the second indication information is carried in an RRC connection reconfiguration message sent by the access network device.

In a third aspect, the present disclosure provides a communication apparatus. The communication apparatus can be an access network device (such as gNB) in the above communication system or a chip or system-on-chip in the access network device, and it can also be functional modules used to implement the methods described in each of the above aspects in the access network device. The communication apparatus can realize the functions performed by the access network device in the above aspects, and these functions can be realized by hardware executing corresponding software. This hardware or software includes one or more modules corresponding to the above functions. The communication apparatus includes: a first receiving module, configured to receive a registration request message from a terminal device, where establishment cause information is carried in the registration request message, the establishment cause information is onboarding a standalone non-public network; and a first processing module, configured to configure a user plane security policy of the terminal device as a first security policy according to the establishment cause information, where the first security policy is used to indicate to activate user plane encryption protection and/or user plane integrity protection for a data radio bearer (DRB) belonging to a protocol data unit (PDU) session.

In some possible implementations, the first security policy includes a first field, the first field is used to indicate that it is required to activate the user plane encryption protection and/or the user plane integrity protection.

In some possible implementations, the first processing module is further configured to associate and store identification information (such as C-RNTI) assigned to the terminal device with the establishment cause information after the first receiving module receives the registration request message from the terminal device.

In some possible implementations, the first receiving module is further configured to receive a PDU session establishment acceptance message from a first core network device belonging to the ONN after the first processing module configures the user plane security policy of the terminal device as the first security policy according to the establishment cause information, where the PDU session establishment acceptance message requests to establish the PDU session for transmitting the SNNP credentials, and identification information of the terminal device is carried in the PDU session establishment acceptance message; the first processing module is further configured to determine that the user plane security policy of the terminal device is configured as the first security policy according to the identification information of the terminal device; start the first security policy for the terminal device.

In some possible implementations, the above communication apparatus further includes: a first sending module, configured to send first indication information to the terminal device after the first processing module determines that the user plane security policy of the terminal device is configured as the first security policy according to the identification information of the terminal device, where the first indication information is used to indicate to activate the user plane encryption protection and/or the user plane integrity protection for the DRB.

In some possible implementations, the first receiving module is further configured to receive the user plane security policy of the terminal device indicated by a second core network device belonging to the ONN; the first processing module is further configured to overrule the user plane security policy of the terminal device indicated by the second core network device.

In the fourth aspect, the present disclosure provides a communication apparatus. The communication apparatus can be a terminal device (such as a UE) in the above communication system or a chip or system-on-chip in the terminal device, and it can also be functional modules used to implement the methods described in each of the above aspects in the terminal device. The communication apparatus can realize the functions performed by the terminal device in the above aspects, and these functions can be realized by hardware executing corresponding software. This hardware or software includes one or more modules corresponding to the above functions. The communication apparatus includes: a second receiving module, configured to receive second indication information from an access network device, where the second indication information is used to indicate whether to activate user plane encryption protection and/or user plane integrity protection for a data radio bearer (DRB) belonging to a protocol data unit (PDU) session; a second processing module, configured for the terminal device to verify whether the second indication information meets a security requirement for protecting standalone non-public network credentials; determine whether to initiate the user plane encryption protection and/or the user plane integrity protection for the DRB according to a verification result.

In some possible implementations, the second processing module is configured to reject a radio resource control (RRC) connection reconfiguration request from the access network device, when the verification result indicates that the second indication information does not meet the security requirement; or, initiate the user plane encryption protection and/or the user plane integrity protection for the DRB, when the verification result indicates that the second indication information meets the security requirement.

In some possible implementations, the second processing module is configured to verify the second indication information to indicate whether to activate the user plane encryption protection and/or the user plane integrity protection for the DRB; where, it indicates that the second indication information does not meet the requirement, when the second indication information indicates to deactivate the user plane encryption protection and/or the user plane integrity protection for the DRB on a terminal device side; and it indicates that the second indication information meets the security requirement, when the second indication information indicates to activate the user plane encryption protection and/or the user plane integrity protection for the DRB on the terminal device side.

In some possible implementations, the second indication information is carried in an RRC connection reconfiguration message sent by the access network device.

In a fifth aspect, the present disclosure provides an access network device, including: a memory; and a processor, connected to the memory, and configured to execute computer-executable instructions stored on the memory to implement the communication method according to the first aspect, the second aspect and any possible implementation thereof.

In a sixth aspect, the present disclosure provides a terminal device, including: a memory; and a processor, connected to the memory, and configured to execute computer-executable instructions stored on the memory to implement the communication method according to the first aspect, the second aspect and any possible implementation thereof.

In a seventh aspect, the present disclosure provides a non-transient computer storage medium, having computer-executable instructions stored thereon, where the computer-executable instructions are able to implement the communication method according to the first aspect, the second aspect and any possible implementation thereof after being executed by a processor.

In this disclosure, the access network device can autonomously configure the UP security policy on the Uu interface, and configure the security policy of the PDU session used to transmit SNPN credentials as "required", to indicate to activate user plane encryption protection and/or user plane integrity protection for the DRB of the PDU session, thereby protecting the SNPN credentials. Further, the terminal device can verify whether the security activation indication issued by the access network device meets the security requirement for protecting the SNPN credentials. When the security activation indication issued by the access network device does not meet the security requirement for protecting SNPN credentials, the terminal device can reject the request from the access network device, to avoid security risks of SNPN credentials and protect the SNPN credentials.

Other implementations of embodiments of the present disclosure will be apparent to those skilled in the art from consideration of the specification and practice of the present disclosure disclosed herein. The present disclosure is intended to cover any variation, use, or adaptation of embodiments of the present disclosure, which are in accordance with the general principles of embodiments of the present disclosure and include common general knowledge or conventional technical means in the art that are not disclosed in embodiments of the present disclosure. The specification and embodiments are illustrative only, and the real scope and spirit of embodiments of the present disclosure is defined by the appended claims.

It should be understood that embodiments of the present disclosure is not limited to the precise structures that have been described above and shown in the drawings, and various modifications and changes can be made without departing from the scope thereof. The scope of embodiments of the present disclosure is limited only by the appended claims.

What is claimed is:

1. A communication method, comprising:
receiving, by an access network device, a registration request message from a terminal device, wherein establishment cause information is carried in the registration request message, and the establishment cause information indicates onboarding to a standalone non-public network, wherein the establishment cause information is used by an access network device to configure a user plane security policy of the terminal device during an initial access associated with the registration request; and
configuring, by the access network device, the user plane security policy of the terminal device as a first security policy according to the establishment cause information of the registration request message, wherein the first security policy is used to indicate activation of at least one of user plane encryption protection or user plane integrity protection for a data radio bearer (DRB) belonging to a protocol data unit (PDU) session used to transmit standalone non-public network credentials that meet a security requirement necessitated by the terminal device for protecting the standalone non-public network credentials.

2. The method according to claim 1, wherein the first security policy comprises a first field, the first field is used to indicate that it is required to activate at least one of the user plane encryption protection or the user plane integrity protection.

3. The method according to claim 1, wherein after the access network device receives the registration request message from the terminal device, the method further comprises:
associating and storing, by the access network device, identification information of the terminal device with the establishment cause information, wherein the identification information of the terminal device is assigned by the access network device to the terminal device.

4. The method according to claim 1, wherein after the access network device configures the user plane security policy of the terminal device as the first security policy according to the establishment cause information, the method further comprises:
receiving, by the access network device, a PDU session establishment acceptance message from a first core network device, wherein the PDU session establishment acceptance message corresponds to the PDU session, and identification information of the terminal device is carried in the PDU session establishment acceptance message, the first core network device belongs to an onboarding network (ONN), and the ONN is used to transmit standalone non-public network credentials;
determining, by the access network device, that the user plane security policy of the terminal device is configured as the first security policy according to the identification information of the terminal device; and
executing, by the access network device, the first security policy for the terminal device.

5. The method according to claim 4, wherein after the access network device determines that the user plane security policy of the terminal device is configured as the first security policy according to the identification information of the terminal device, the method further comprises:
sending, by the access network device, first indication information to the terminal device, wherein the first indication information is used to indicate activation of at least one of the user plane encryption protection or the user plane integrity protection for the DRB.

6. The method according to claim 4, further comprising:
receiving, by the access network device, the user plane security policy of the terminal device indicated by a second core network device, wherein the second core network device belongs to the ONN; and
overruling, by the access network device, the user plane security policy of the terminal device indicated by the second core network device.

7. A non-transient computer storage medium, having computer-executable instructions stored thereon, wherein the computer-executable instructions, wherein executed by a processor, cause the processor to implement the communication method according to claim 1.

8. A communication method, comprising:
receiving, by a terminal device, second indication information from an access network device in response to a registration request message from the terminal device, wherein the second indication information is used to indicate whether to activate at least one of user plane encryption protection or user plane integrity protection for a data radio bearer (DRB) belonging to a protocol data unit (PDU) session used to transmit standalone non-public network credentials for establishing communications from onboarding to a standalone non-public network;
verifying, by the terminal device, whether the second indication information meets a security requirement for protecting standalone non-public network credentials; and
determining, by the terminal device, whether to perform at least one of the user plane encryption protection or the user plane integrity protection for the DRB according to a verification result.

9. The method according to claim 8, wherein determining whether to perform at least one of the user plane encryption protection or the user plane integrity protection for the DRB according to a verification result comprises:
rejecting a radio resource control (RRC) connection reconfiguration request from the access network device, in response to determining that the verification result indicates that the second indication information does not meet the security requirement; or,
initiating at least one of the user plane encryption protection or the user plane integrity protection for the DRB, in response to determining that the verification result indicates that the second indication information meets the security requirement.

10. The method according to claim 8, wherein verifying whether the second indication information meets the security requirement for protecting the standalone non-public network credentials comprises:
verifying the second indication information to indicate whether to activate at least one of the user plane encryption protection or the user plane integrity protection for the DRB;
wherein, the second indication information does not meet the requirement, in response to determining that the second indication information indicates deactivation of at least one of the user plane encryption protection or the user plane integrity protection for the DRB on a terminal device side; and the second indication information meets the security requirement, in response to determining that the second indication information indicates activation of at least one of the user plane encryption protection or the user plane integrity protection for the DRB on the terminal device side.

11. The method according to claim 8, wherein the second indication information is carried in an RRC connection reconfiguration message sent by the access network device.

12. A terminal device, comprising:
a memory; and
a processor, connected to the memory, wherein the processor is configured to execute computer-executable instructions stored on the memory to implement the communication method according to claim 8.

13. A non-transient computer storage medium, having computer-executable instructions stored thereon, wherein the computer-executable instructions, wherein executed by a processor, cause the processor to implement the communication method according to claim 8.

14. An access network device, comprising:
a memory; and
a processor, connected to the memory, wherein the processor is configured to:
receive a registration request message from a terminal device, wherein establishment cause information is carried in the registration request message, and the establishment cause information indicates onboarding to a standalone non-public network, wherein the establishment cause information is used by an access network device to configure a user plane security policy of the terminal device during an initial access associated with the registration request; and
configure a user plane security policy of the terminal device as a first security policy according to the establishment cause information of the registration request message, wherein the first security policy is used to indicate activation of at least one of user plane encryption protection or user plane integrity protection for a data radio bearer (DRB) belonging to a protocol data unit (PDU) session used to transmit standalone non-public network credentials that meet a security requirement necessitated by the terminal device for protecting the standalone non-public network credentials.

15. The access network device according to claim 14, wherein the first security policy comprises a first field, the first field is used to indicate that it is required to activate at least one of the user plane encryption protection or the user plane integrity protection.

16. The access network device according to claim 14, wherein the processor is further configured to associate and store identification information of the terminal device with the establishment cause information after the access network device receives the registration request message from the terminal device, wherein the identification information of the terminal device is assigned by the access network device to the terminal device.

17. The access network device according to claim 14, wherein the processor is further configured to:

receive a PDU session establishment acceptance message from a first core network device after the access network device configures the user plane security policy of the terminal device as the first security policy according to the establishment cause information, wherein the PDU session establishment acceptance message corresponds to the PDU session, and identification information of the terminal device is carried in the PDU session establishment acceptance message, the first core network device belongs to an onboarding network (ONN), and the ONN is used to transmit standalone non-public network credentials;

determine that the user plane security policy of the terminal device is configured as the first security policy according to the identification information of the terminal device; and execute the first security policy for the terminal device.

18. The access network device according to claim 17, wherein the processor is further configured to send first indication information to the terminal device after the access network device determines that the user plane security policy of the terminal device is configured as the first security policy according to the identification information of the terminal device, wherein the first indication information is used to indicate to activate at least one of the user plane encryption protection or the user plane integrity protection for the DRB.

19. The access network device according to claim 17, wherein the processor is further configured to:

receive the user plane security policy of the terminal device indicated by a second core network device, wherein the second core network device belongs to the ONN; and overrule the user plane security policy of the terminal device indicated by the second core network device.

\* \* \* \* \*